United States Patent [19]

Taniguchi et al.

[11] Patent Number: 5,202,719
[45] Date of Patent: Apr. 13, 1993

[54] CAMERA HAVING A BUILT-IN ELECTRONIC FLASH DEVICE AND A DETACHABLE FLASH DEVICE SELECTIVELY OPERATED TO ELIMINATE RED-EYE PHENOMENA

[75] Inventors: Nobuyuki Taniguchi, Nishinomiya; Hidehiko Fujii, Sakai; Tsutomu Ichikawa, Hashimoto; Takeshi Fukunaga; Atsushi Sumitani, both of Sakai, all of Japan

[73] Assignee: Minolta Camera Kabushiki Kaisha, Osaka, Japan

[21] Appl. No.: 924,438

[22] Filed: Jul. 31, 1992

Related U.S. Application Data

[63] Continuation of Ser. No. 562,748, Aug. 6, 1990, abandoned.

[30] Foreign Application Priority Data

Aug. 4, 1989 [JP] Japan .................................. 1-203628

[51] Int. Cl.⁵ .............................................. G03B 15/05
[52] U.S. Cl. .................................. 354/413; 354/127.1; 354/132
[58] Field of Search .................... 354/413, 415, 127.1, 354/127.13, 132, 126, 149.11, 289.1

[56] References Cited

U.S. PATENT DOCUMENTS

| | | | |
|---|---|---|---|
| 4,573,789 | 3/1986 | Taniguchi et al. | 354/132 |
| 4,692,013 | 9/1987 | Okino | 354/413 |
| 4,897,684 | 1/1990 | Serikawa | 354/132 |
| 4,978,989 | 12/1990 | Nakano et al. | 354/413 |
| 5,055,865 | 10/1991 | Fujino et al. | 354/132 |

FOREIGN PATENT DOCUMENTS 62-196635  8/1987  Japan .

Primary Examiner—Michael L. Gellner
Assistant Examiner—Cassandra Spyrou
Attorney, Agent, or Firm—Willian Brinks Olds Hofer Gilson & Lione

[57] ABSTRACT

A camera having a built-in electronic flash device and a detachable electronic flash device, provided with a detecting sensor for detecting photographing condition, which judges whether or not a red-eye phenomenon caused by a reflection of flash light on human retinae tends to occur. In accordance with the judgment, activation of both flash devices are controlled.

16 Claims, 6 Drawing Sheets

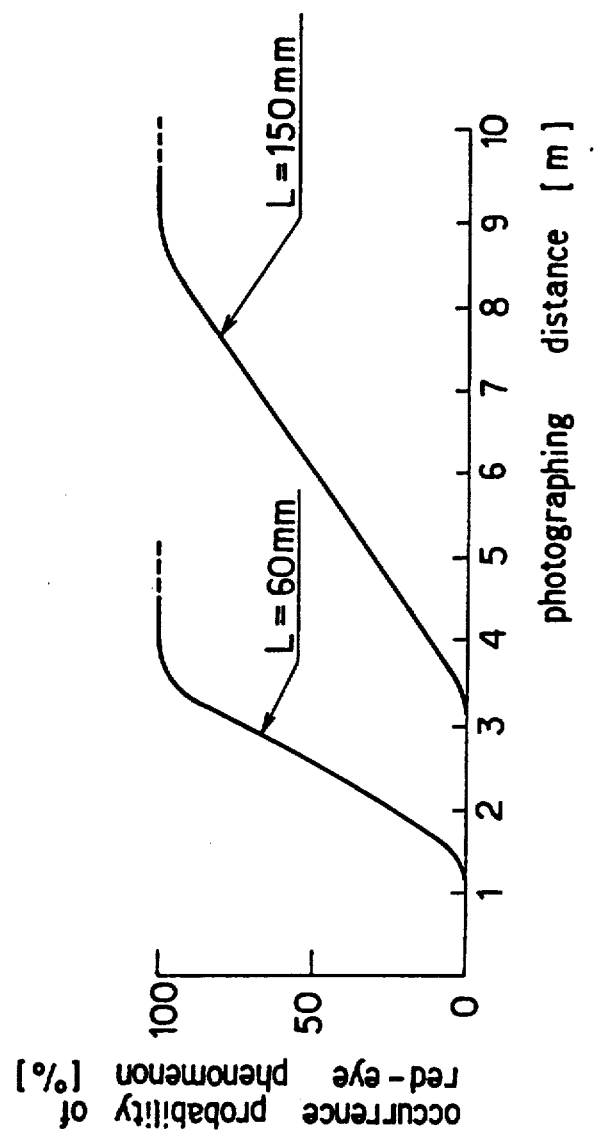

CAMERA HAVING A BUILT-IN ELECTRONIC FLASH DEVICE AND A DETACHABLE FLASH DEVICE SELECTIVELY OPERATED TO ELIMINATE RED-EYE PHENOMENA

This application is a continuation of application Ser. No. 07/562,748, filed Aug. 6, 1990, now abandoned.

BACKGROUND OF THE INVENTION

The present invention releates to a camera having a built-in electronic flash device, which allows photographing with the attachment of a detachable electronic flash device.

Among recent compact-sized cameras with 35 mm format photographic film, a camera type with a built-in flash device is the most popular, while many camera types with a built-in flash device are also nowadays found in the field of single-lens reflex cameras. For the above-mentioned cameras with a built-in flash device, however, the distance between the optical axis of the object lens and the light emitting section is limited due to the carrying ease thereof and a so called red-eye phenomenon may often occur, with high probability which is caused by reflection of flash light on human retinae as an object when the flash device is used.

It is known that the above-mentioned red-eye phenomenon is caused by normal reflection of flash light on the retinae of the object (human body) and the occurrence probability thereof depends upon the distance L between the optical axis of the lens and the light emitting section and the photographing distance D. The above-mentioned relation is shown in FIG. 4 for a case of L=60 and L=150, namely, the occurrence probability of the red-eye phenomenon is given as a function of the distance L and the photographing distance D. If the photographing distance D is constant, the longer the distance L between the optical axis of the photographing lens and the light emitting section, the occurrence probability of the red-eye phenomenon becomes lower. While the distance L is constant, the above-mentioned probability is reduced in accordance with the decrease of the photographing distance D. Furthermore, it is also known that in general the smaller the image magnification, it becomes much more difficult to identify the red-eye phenomenon even if occurred, while the red-eye phenomenon tends to occur more in dark places where human pupils are dilated, than in daylight places where human pupils are closed. In other words, the occurrence probability or conspicuousness of the red-eye phenomenon depends upon the above-mentioned photographing conditions.

For preventing the red-eye phenomenon, it is known to take the countermeasure in such manner that the camera body (including single-lens reflex cameras with a built-in flash device) is provided with an accessory shoe for another detachable flash device to be mounted thereon, so that the distance L between the light emitting section and the lens optical axis is increased. In such cases the detachable electronic flash device only is illuminated while the built-in electronic flash device is controlled in the inactivated condition.

U.S. Pat. No. 4,011,569 and Japanese Laid-Open Patent Publication No. 59-58425 are known as typical examples of the above-mentioned device. There is another type of camera of which built-in flash device can be activated even if a detachable flash device is attached, however, a selective control according to the photographing conditions is not provided for each of the built-in and detachable electronic flash device.

As described above, the control for activating not the built-in flash device but the detachable flash device only is somewhat effective in reducing the occurrence of red-eye phenomenon in dark places with high occurrence probability. It is to be noted, however, that the photographing conditions may be improved if both of the built-in and detachable flash devices are activated at the same time. For example, the activation of the both flashes can apply large guide number of the flash in conditions with low occurrence probability (conspicuousness) of the red-eye phenomenon, such as a comparatively bright place even in low brightness or a small image magnification with the use of a wide-angle lens. Moreover, the pupils of human eyes tend to be closed frequently even in back-light conditions at daytime so that the red-eye phenomenon does not occur, therefore, the activation of both flashes is useful for applying higher guide number.

On the other hand, if an object is found at a short distance (for example, more or less 2 m) in a dark place, the occurrence probability of red-eye phenomenon is about 10% at L=60 mm and the red-eye phenomenon does not often occur even if the built-in flash device is used. Moreover, if an object is found in a range for macro photography, a shift (parallax) appears for the orientation angle of the built-in flash device to the detachable flash device, as shown in FIG. 5, therefore, luminous intensity distribution becomes irregular if both flashes are activated at the same time. In such cases the control for activating the built-in flash device only with the detachable flash device kept off is useful in reducing the irregularity of the luminous intensity distribution and advantageous from the viewpoint of energy saving. As shown in FIG. 5, the distance between the built-in and detachable flash device becomes shorter, the above-mentioned irregularity tends to appear easier.

SUMMARY OF THE INVENTION

It is an object of the present invention to provide a camera having a built-in flash device which allows proper photographing without the red-eye phenomenon through appropriate selection of flashing combinations from both of the built-in and detachable flash devices, based on respective photographing information (object distance, focal length of lens, brightness of object, presence/absence of back-light condition), and further, energy saving can be accomplished.

For solving the above-mentioned problems, this invention provides a camera having a built-in flash device and a detachable flash device, which is provided with a detection means for focal length of photographing lens, distance from the camera to an object to be photographed, brightness of object and presence/absence of back-light condition, and a control means which selects combinations of light emission of both of the built-in and detachable flash devices based on the photographing information obtained by the above-mentioned detection means and controls light emission when the detachable flash device is attached on a camera body.

Moreover, a camera of this invention may be provided with a storing means for storing predetermined information of an object including at least conditions producing the red-eye phenomenon, a judging means which compares the above-mentioned information of an object with the photographing information obtained from the above-mentioned detection means and judges occurrence probability of the red-eye phenomenon, and an alarming means for issuing an alarm when the abovementioned judging means recognizes the occurrence of the red-eye phenomenon.

Thus, both of the built-in and detachable flash devices are activated in a back-light condition, while if an object distance is found at short distance or in a range for macro photography, the built-in flash device only may be activated and if it is judged that the brightness is low and the red-eye phenomenon hardly occurs, both of the built-in and detachable flash devices may be activated at the same time.

According to the above-mentioned construction, a proper combination from both of the built-in and detachable flash devices is selected for photographing with the detachable flash device based on the respective photographing information such as detected object distance, lens focal length, brightness of object and presence/absence of back-light condition. Furthermore, if it is judged that the detected information coincides with predetermined memory information for occurrence condition of the red-eye phenomenon and others, the relevant alarm display is actuated. Furthermore, sufficient illumination is given to any object in back-light and/or low brightness condition, resulting in no irregular distribution of luminous intensity.

DESCRIPTION OF THE DRAWINGS

FIG. 4 shows a relation between occurrence probability of the red-eye phenomenon and distance of lens optical axis to light emitting section thereof.

DETAILED DESCRIPTION OF THE PREFERRED EMBODIMENTS OF THE INVENTION

An embodiment of a camera having a built-in electronic flash device according to the present invention will now be described in detail with reference to FIGS. 1 and 2.

Figure 1:
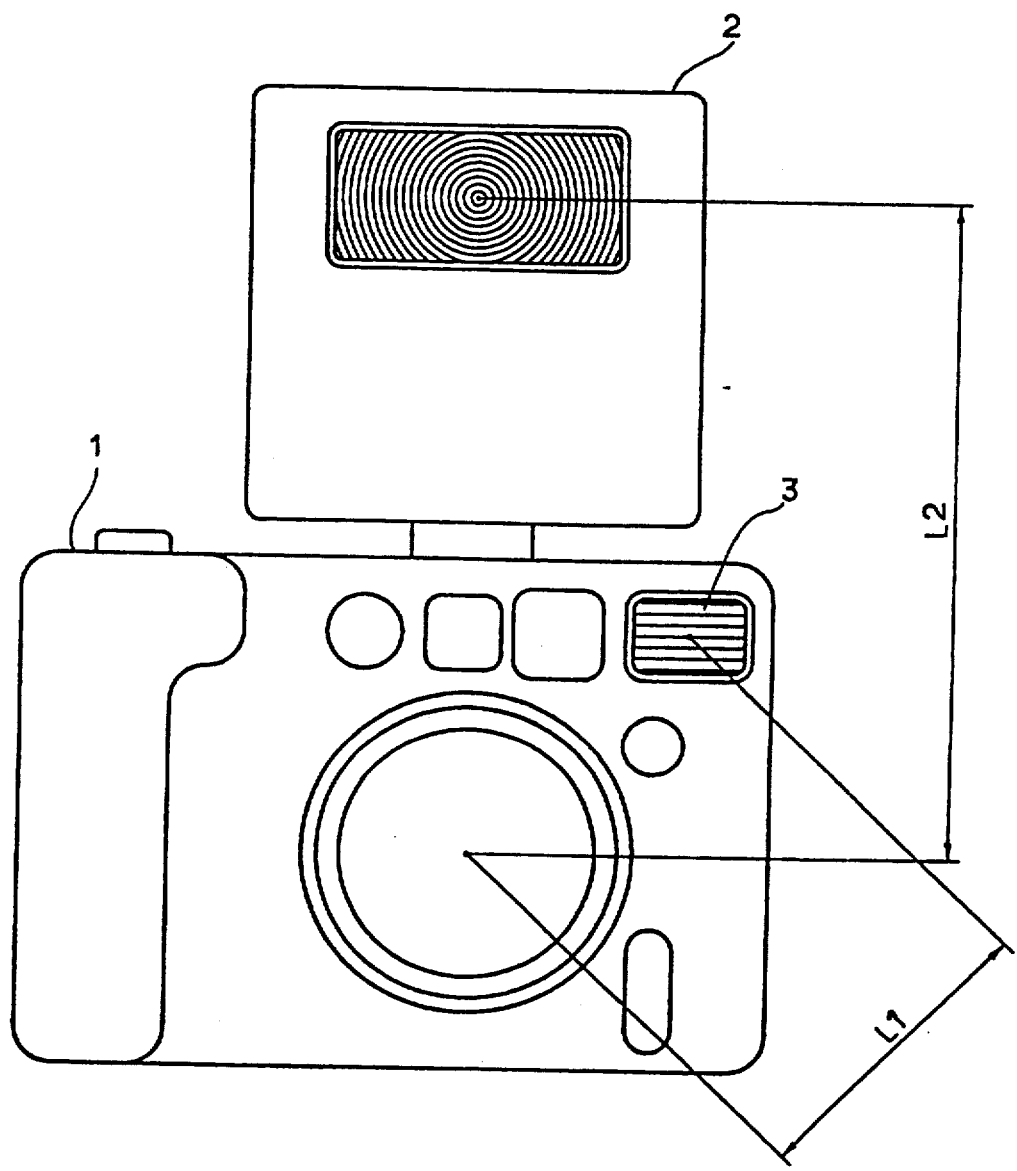
FIG. 1 shows a front view of an embodiment of the present invention wherein a detachable flash device is attached to a camera with a built-in flash device.

FIG. 1 shows a camera 1 having a built-in electronic flash device 3, to which a detachable flash device 2 is attached, where L1 indicates a distance between a lens optical axis and a light emitting section in a built-in electronic flash device 3, and L2 indicates a distance between a lens optical axis and a light emitting section of the detachable flash device 2, L2 being larger than L1 (L2>L1). As shown in FIG. 4, the shorter the distances (L1,L2), the occurrence probability of the red-eye phenomenon becomes higher even though the photographing distance is short.

Figure 2:
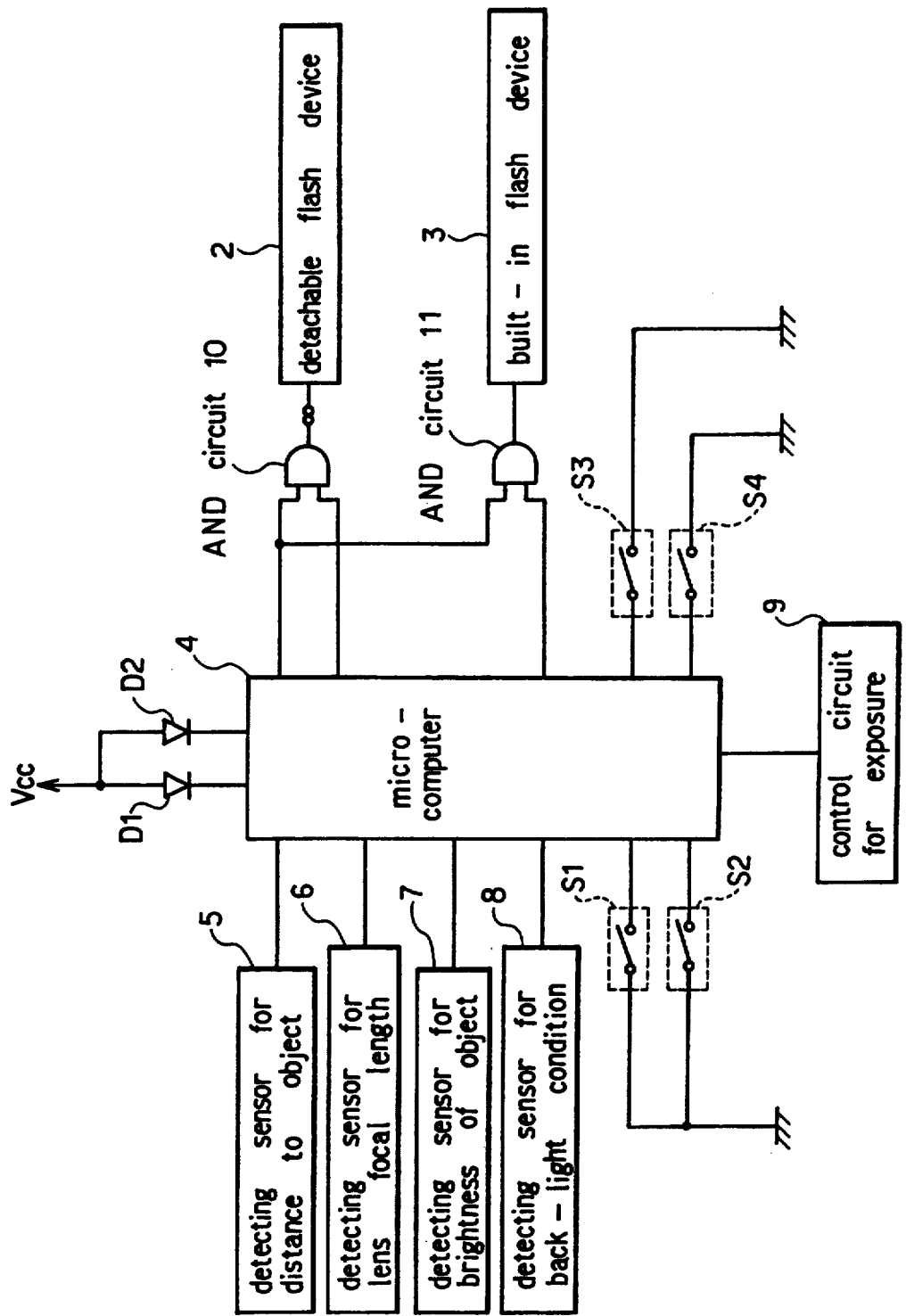
FIG. 2 shows a block diagram thereof.

FIG. 2 shows a block diagram of a flash light emitting control circuit provided with a microcomputer 4 a the control means. The microcomputer 4 has a built-in memory as a memory means, wherein the information of an object for judging occurrence probability of the red-eye phenomenon from the photographing information such as object distance, lens focal length, brightness of an object, presence/absence of back-light condition, and so on are inputted previously. Moreover, the microcomputer 4 receives input of signals from respective detecting means such as a sensor 5 for detecting the object distance, a detecting sensor 7 for brightness of the object, and a detecting sensor 8 for back-light conditions. Furthermore, the microcomputer 4 is provided with other input means, a light metering and distance measuring switch S1, a release switch S2, a detecting switch S3 for detecting whether the detachable flash device is attached on a flash attaching portion of the camera body, and a switch S4 for converting the built-in flash device 3 into an automatic flashing mode.

Output terminal of the microcomputer 4 is connected with the built-in flash device 3 and the detachable flash device 2 via AND circuits 10 and 11 and provided with a blinking light emitting diode D1 for recommending the use of flashes and another blinking light emitting diode D2 for alarming occurrence of the red-eye phenomenon as a display means. The respective flash devices are activated when outputs of the AND circuits 10 and 11 become high level. Moreover, a control circuit 9 for controlling exposure is connected to the microcomputer 4.

Figure 3:
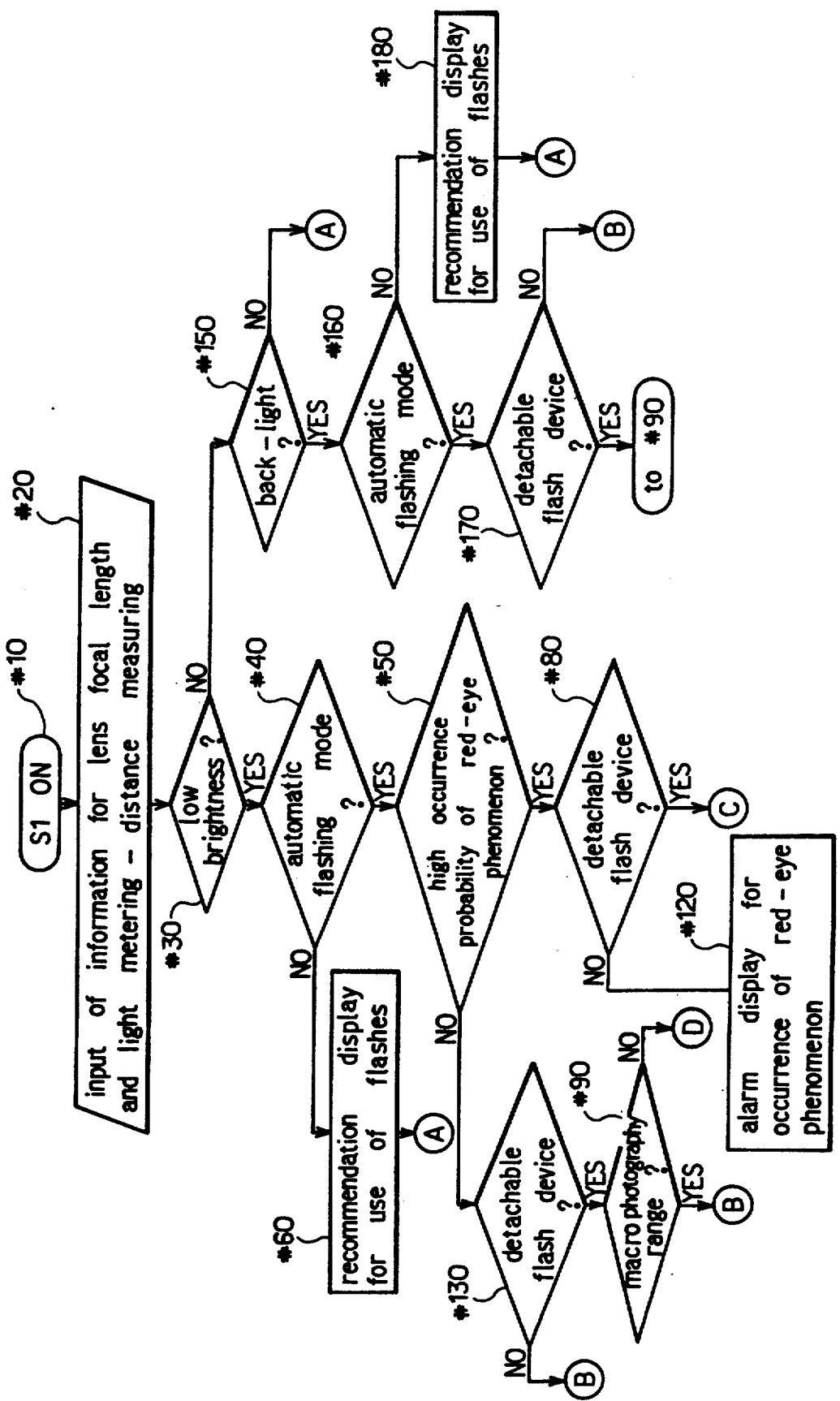
FIGS. 3a and 3b shows a flow chart illustrating control steps thereof.

Now, control operations of the above-mentioned control circuit will be described with reference to flow charts of FIGS. 3(a) and (b). When a light metering and distance measuring switch S1 is ON (step #10), the photographing information such as object distance, lens focal length, brightness of object, and presence/absence of back-light condition are inputted into the microcomputer 4 through the sensor 5, 6, 7 and 8 respectively (#20). The microcomputer 4 judges whether it is low brightness condition or not based on the above-mentioned information (#30). In case of low brightness condition, it is judged whether the built-in flash operation switch S4 is set into automatic flashing mode or not (#40). If the automatic flashing mode is identified, it is judged whether the red-eye phenomenon occurs or not according to the above-mentioned photographing information (#50). If not, the microcomputer 4 gives a recommendation display for the use of flashes through the diode D1 (#60), then controls outputs of the AND circuits 10 and 11 into low level (hereinafter referred to as "Lo") and sets inputs of the detachable flash device 2 and the built-in flash device 3 to "Lo" (#70).

When it is judged that the red-eye phenomenon occurs at step #50, then a further step is executed to judge whether the detachable flash device 2 is connected or not (#80). If it is judged as connected, the AND circuits 10 and 11 are set to high level (hereinafter referred to as "Hi") and "Lo" respectively, the inputs of the detachable flash device 2 and the built-in flash device 3 being kept at "Hi" and "Lo" (#110). Namely, the detachable flash device 2 only is actuated, reducing occurrence of the red-eye phenomenon.

If it is judged that the detachable flash device 2 is not connected at step #80, the diode D2 gives an alarm display for occurrence of the red-eye phenomenon (#120), and the program advances to step #100. When it is judged that the red-eye phenomenon does not occur at step #50, a further step is executed to judge whether the detachable flash device 2 is connected or not (#130). If it is connected, it is judged whether there is a range for macro photography or not (#90). If there is a range for macro photography, the AND circuits 10 and 11 are set to "Lo" and "Hi" respectively, inputs of the detachable flash device 2 and the built-in flash device 3 being kept at "Lo" and "Hi" respectively (#100). Namely, in a range for macro photography, the built-in flash device 3 only is actuated in order to prevent irregular distribution of luminous intensity, because the red-eye phenomenon hardly occurs and the above-mentioned flash device can illuminate the object sufficiently. If not in a range for macro photography, both of the AND circuits 10 and 11 are kept at "Hi", setting the inputs of detachable flash device 2 and the built-in flash device 3 to "Hi" (#140). In other words, both flash devices are actuated at the same time in order to obtain higher amount of flash light because low occurrence probability of the red-eye phenomenon is judged. When the detachable flash device 2 is not connected at step #130, the program advances to step #100.

On the other hand, if low brightness is not judged in the step #30, it is judged whether the back-light condition is present or not (#150). If it is back-light condition, then it is judged whether it is an automatic flashing mode or not (#160). If it is an automatic flashing mode, it is judged whether the detachable flash device 2 is connected or not (#170). If it is judged as connected, the program advances to step #90, then it is judged if there is a range for macro photography or not. According to the result of the judgment, the program advances to step #100 or #140. If the detachable flash device 2 is not connected, the program advances to step #100. If it is not an automatic flashing mode at step #160, the diode D1 gives recommendation display for the use of flashes (#180), the program advances to step #70. If it is not back-light condition at step #150, the program advances to step #70.

After above-mentioned steps #70, #100, #110 and #140, the microcomputer 4 then judges whether the release switch S2 is turned ON or not (#190). If ON, an exposure control circuit 9 is activated (#200) for exposure, switching the display OFF (#220), and terminating all operations (#230). If the above-mentioned switch S2 is not turned ON, it is judged whether a light metering and distance measuring switch S1 is turned OFF or not (#210). The abovementioned switch S1 is turned OFF when a photographer interrupts photographing therefore, the display is turned OFF (#220) and the camera operation is all over (step #230). If the light metering and distance measuring switch S1 is not OFF at step #210, the program returns to step #190 and the judgments at steps #190 and #210 are repeated until the switch S2 is turned ON or the switch S1 is turned OFF.

As described above, appropriate photographing is assured with sufficient illumination to the object, preventing useless flashing and reducing occurrence of the red-eye phenomenon, because light emission of the built-in and detachable flash devices 2 and 3 are controlled according to respective photographing information.

Figure 3B:
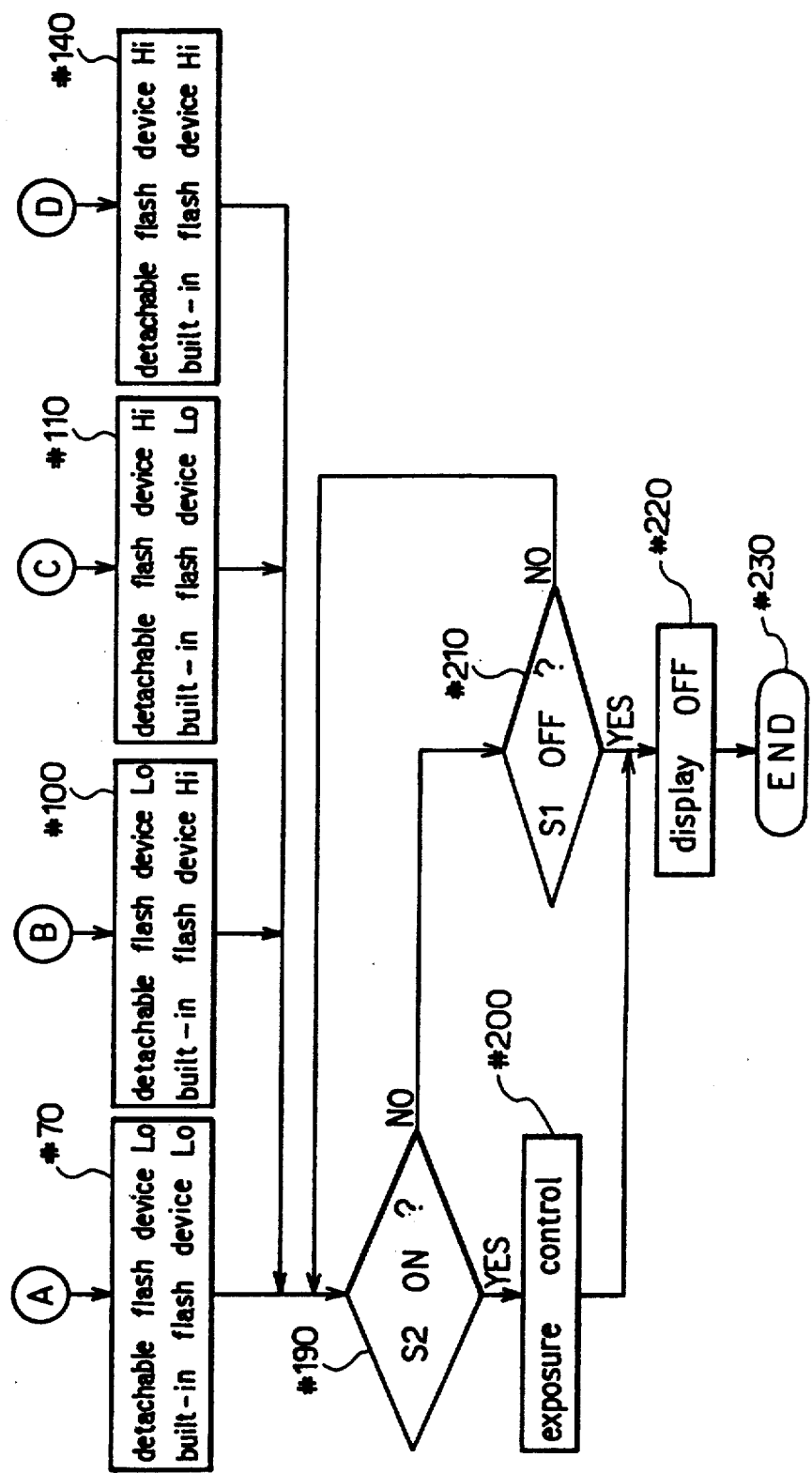
Figure 5:
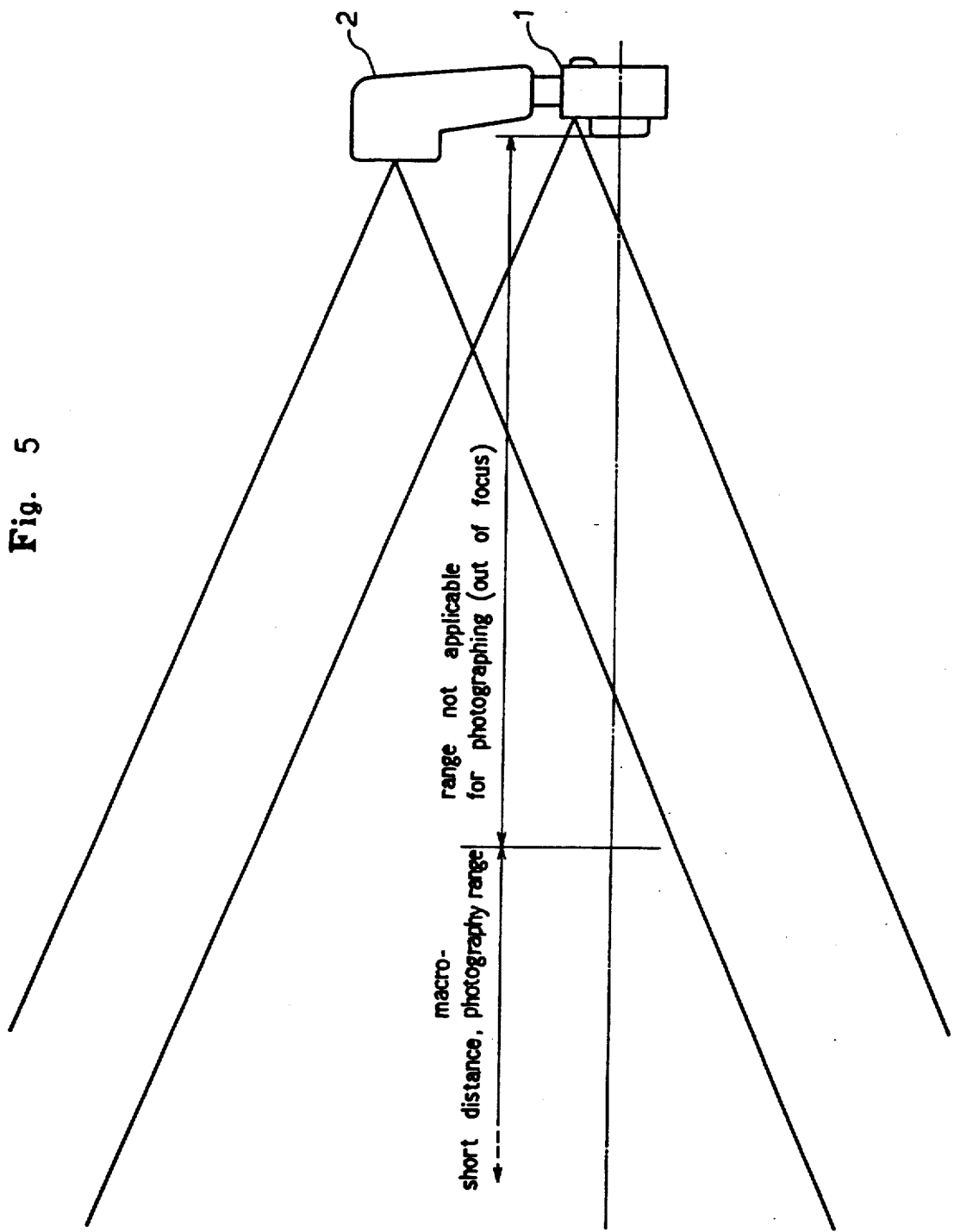
FIG. 5 shows shift (parallax) of orientation angles between the built-in and detachable flash device.

Then, a modification to the above-mentioned embodiment will be described, i.e., the step #140 in FIG. 3(b) is omitted in order to avoid unnatural shadow caused by simultaneous emitting light of the built-in and detachable flash devices in which luminous distribution characteristics differ from each other.

Thus, if a range for macro photography is not judged at step #90, the program advances to step #110 in order to actuate the detachable flash device only. Therefore, the built-in flash device only is actuated in a range for macro photography with low occurrence probability of the red-eye phenomenon, the detachable flash device only is actuated in a range for non-macro photography, preventing occurrence of the red-eye phenomenon more positively and issuing an alarm if high occurrence probability of the red-eye phenomenon is identified.

As described above, a camera of this invention assures appropriate illumination of an object, because proper flashing combination of the built-in and detachable flash devices is selected according to various detected photographing information when a detachable flash device is attached to a camera having a built-in flash device, and at the same time, photographing with energy saving can be achieved.

Further, when the detachable flash device is actuated, sufficient illumination is usually given and the light emitting section is located apart from the lens optical axis, resulting in low occurrence probability of the red-eye phenomenon. Therefore, the built-in flash device is not actuated when the detachable flash device is attached on the camera body. On the contrary to the above-mentioned prior arts, this invention assures appropriate photographing in such manner that not only the detachable flash device but the built-in flash device is actuated at the same time when pupils of human eyes are probably not dilated widely in back-light condition with comparatively sufficient brightness. As a result, photographing under sufficient illumination to the object, without occurrence of the red-eye phenomenon is assured. When the built-in flash device only is actuated in case the object is at short distance or in macro photographing, the red-eye phenomenon hardly occurs, so that irregular distribution of luminous intensity and useless energy consumption are prevented.

Although the present invention has been fully described in connection with the preferred embodiments thereof with reference to the accompanying drawings, it it to be noted that various changes and modifications are apparent to those skilled in the art. Such changes and modifications are to be understood as included within the scope of the present invention as defined by the appended claims unless they depart therefrom.

What is claimed is:

1. A camera comprising:
   a built-in electronic flash device;
   a flash attaching portion to which a detachable electronic flash device can be attached;
   first means for detecting whether or not a red-eye phenomenon tends to occur in a current photographing condition;
   second means for detecting whether or not the detachable electronic flash device is attached to the camera; and
   means for prohibiting the built-in electronic flash device from emitting light when it is detected that said detachable electronic flash device is attached to the camera and the red-eye phenomenon tends to occur as well.

2. A camera comprising:
   a built-in electronic flash device;
   a flash attaching portion to which a detachable electronic flash device can be attached;
   first means for detecting whether or not an object distance is within a distance range shorter than a predetermined distance and within which a red-eye phenomenon tends not to occur;
   second means for detecting whether or not the detachable electronic flash device is attached to the camera; and
   means for prohibiting the detachable electronic flash device from emitting light when it is detected that said detachable electronic flash device is attached to the camera and the object distance is within said distance range.

3. A camera comprising:
a built-in electronic flash device;
a flash attaching portion to which a detachable electronic flash device can be attached;
first means for detecting a focal length of a taking lens of the camera as a first kind of data, an object distance as a second kind of data and an object brightness as a third kind of data, and detecting whether or not an object is under a backlight condition as a fourth kind of data;
second means for detecting whether or not the detachable electronic flash device is attached to the camera;
means for determining which electronic flash device should be enabled to emit light by distinguishing whether or not a red-eye phenomenon tends to occur based on a result of the detection by said first means; and
means for controlling the light emission of said built-in electronic flash device and said detachable electronic flash device based on the determination by said determining means when said detachable electronic flash device is attached to the camera.

4. A camera as claimed in claim 3 further comprising:
storing means for storing an information including at least one of said first to fourth kinds of data which indicates that the red-eye phenomenon tends to occur;
discriminating means for discriminating whether or not the red-eye phenomenon tends to occur by comparing said information and said data detected by said first means; and
means for warning when said discriminating means discriminates that the red-eye phenomenon tends to occur.

5. A camera as claimed in claim 3, wherein said determining means determines that both of said electronic flash devices should be enabled to emit light when said first means detects that the object is under a back-light condition.

6. A camera as claimed in claim 4, wherein said determining means determines that both of said electronic flash devices should be enabled to emit light when said first means detects that the object is under a back-light condition.

7. A camera as claimed in claim 3, wherein said determining means determines that only the built-in electronic flash device should be enabled to emit light when said first means detects that the object distance is shorter than a predetermined distance.

8. A camera as claimed in claim 4, wherein said determining means determines that only built-in electronic flash device should be enabled to emit light when said first means detects that the object distance is shorter than a predetermined distance.

9. A camera as claimed in claim 3, wherein said determining means determines that both of said electronic flash devices should be enabled to emit light when said first means detects that the object brightness is lower than a predetermined level and said determining means determines that the red-eye phenomenon does not tend to occur.

10. A camera comprising:
a built-in electronic flash device;
a flash attaching portion to which a detachable electronic flash device can be attached;
first means for detecting whether or not an object to be photographed is in a condition that a red-eye phenomenon tends to occur;
second means for detecting whether or not the detachable electronic flash device is attached to the camera;
means for determining which electronic flash device should be enabled to emit light based on a result of the detection by said first means; and
means for controlling the light emission of said built-in electronic flash device and said detachable electronic flash device based on the determination by said determining means when said detachable electronic flash device is attached to the camera.

11. A camera as claimed in claim 10, wherein said condition includes an object distance.

12. A camera as claimed in claim 10, wherein said first means detects whether or not the object is under a back-light condition.

13. A camera comprising:
a built-in electronic flash device having a light emitting portion for emitting light contributing to an exposure;
a flash attaching portion to which a detachable electronic flash device can be attached;
menas for indicating to follow a procedure for preventing a red-eye phenomenon;
means for detecting whether or not the detachable electronic flash device is attached to the camera; and
means for prohibiting the light emitting portion of the built-in electronic flash device from emitting light when said detecting means detects that said detachable electronic flash device is attached to the camera and said indicating means indicates to follow a procedure for preventing red-eye phenomenon.

14. A camera comprising:
a built-in electronic flash device;
a flash attaching portion to which a detachable electronic flash device can be attached;
first means for detecting whether or not an object distance is within a distance range shorter than a predetermined distance and within which parallax between luminous distributing angle of the detachable electronic flash device and picture angle occurs;
second means for detecting whether or not the detachable electronic flash device is attached to the camera; and
means for prohibiting the detachable electronic flash device from emitting light when it is detected that said detachable electronic flash device is attached to the camera and the object is within the distance range.

15. A camera comprising:
a built-in electronic flash device;
a flash attaching portion to which a detachabe electronic flash device can be attached;
first means for detecting a focal length of a taking lens of the camera as a first kind of data, an object distance as a second kind of data and an object brightness as a third kind of data, and detecting whether or not an object is under a backlight condition as a fourth kind of data;
second means for detecting whether or not the detachable electronic flash device is attached to the camera;

means for determining which electronic flash device should be enabled to emit light based on a result of the detection by said first means; and means for controlling the light emission of said built-in electronic flash device and said detachable electronic flash device to select either of mode in which both electronic flash devices are emitted or either of electronic flash device is emitted based on the determination by said determining means when said detachable electronic flash device is attached to the camera.

16. A camera comprising a built-in electronic flash device;

a flash attaching portion to which a detachable electronic flash device can be attached;

first means for detecting a condition of an object to be photographed;

second means for detecting whether or not the detachable electronic flash device is attached to the camera;

means for determining either of mode in which both electronic flash devices are emitted or either of electronic flash device is emitted should be selected based on a result of the detection by said first means; and means for controlling the light emission of said built-in electronic flash device and said detachable electronic flash device based on the determination by said determining means when said detachable electronic flash device is attached to the camera.

* * * * *